United States Patent [19]

Persson et al.

[11] 4,428,680
[45] Jan. 31, 1984

[54] METHOD AND APPARATUS FOR MIXING LIQUID AND PASTE-LIKE SUBSTANCES

[75] Inventors: Goran Persson, Vastra; Lars Johnson, Gothenburg, both of Sweden

[73] Assignee: Goran Persson Maskin AB, Gothenburg, Sweden

[21] Appl. No.: 342,764

[22] Filed: Jan. 26, 1982

[30] Foreign Application Priority Data

Jan. 30, 1981 [SE] Sweden ............................ 8100670

[51] Int. Cl.³ ............................................. B01F 7/22
[52] U.S. Cl. ..................................... 366/296; 366/348
[58] Field of Search ............... 366/296, 295, 293, 294, 366/279, 334, 241, 242, 244, 255, 332, 331, 285, 348, 286; 99/348

[56] References Cited

U.S. PATENT DOCUMENTS

| | | | |
|---|---|---|---|
| 1,392,789 | 10/1921 | Paris | 366/296 |
| 2,209,287 | 7/1940 | Simpson | 366/296 |
| 2,253,989 | 8/1941 | Skinner | 366/296 |
| 2,513,254 | 6/1950 | Savage | 366/329 |
| 2,778,614 | 1/1957 | Koch | 366/296 |
| 3,176,968 | 4/1965 | Appleton | 366/296 |
| 3,330,818 | 7/1967 | Derby | 366/296 |
| 3,580,550 | 5/1971 | Hunnicutt | 366/312 |
| 3,799,459 | 3/1974 | Bakewell | 366/296 |
| 4,197,019 | 4/1980 | Schold | 366/294 |

Primary Examiner—Robert W. Jenkins
Attorney, Agent, or Firm—Holman & Stern

[57] ABSTRACT

A method and an apparatus for mixing both liquid and pastelike substances, especially foods in pots of large kitchens. An upward and downward circulatory motion of the substance is produced by two oppositely rotating mixers (10, 11), which while rotating are raised and lowered through the substance. Each mixer includes blade groups (24-27 and 28-31) with opposite inclinations as viewed in the rotation direction, such that while raising and lowering the mixers layer by layer a part of the substance is lifted mechanically while another part is pressed downward. The apparatus includes of a mobile unit (1) which can be fixed and centered in an exact position relative to the pot (2).

6 Claims, 4 Drawing Figures

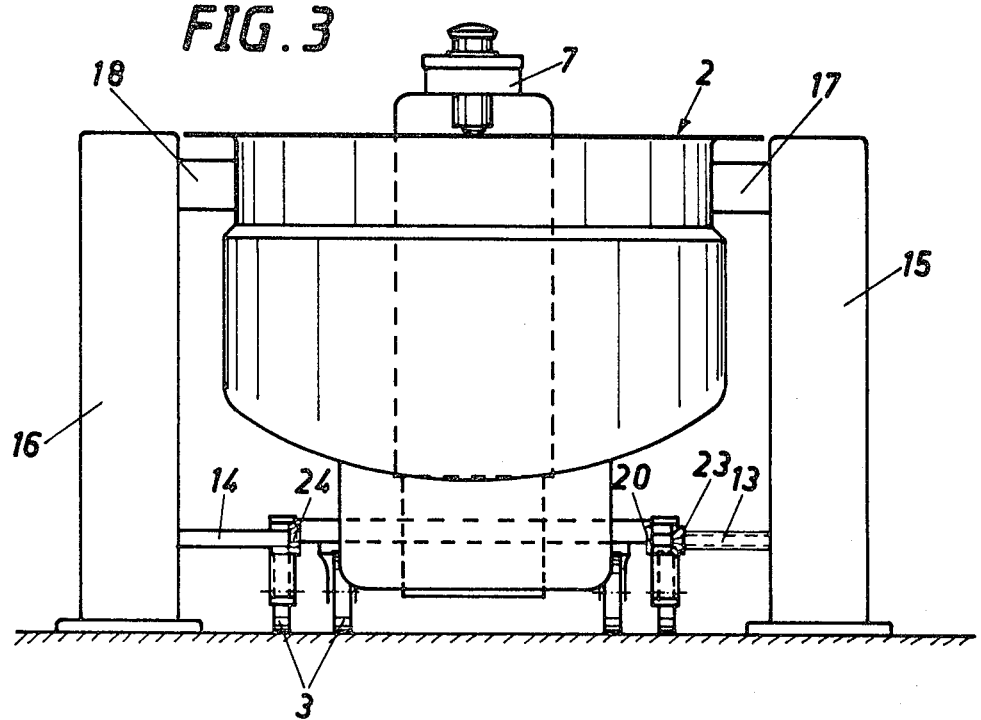
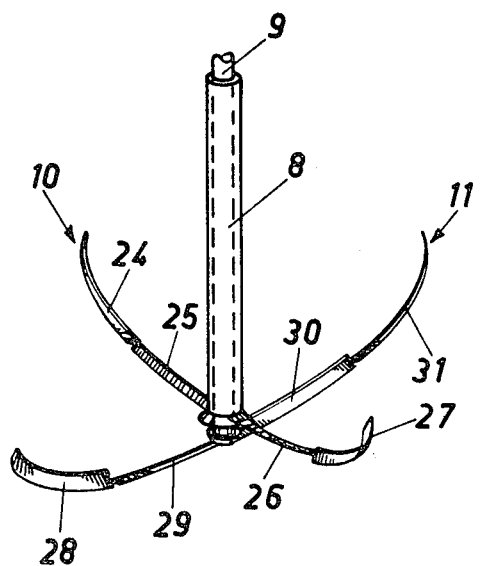

METHOD AND APPARATUS FOR MIXING LIQUID AND PASTE-LIKE SUBSTANCES

BACKGROUND OF THE INVENTION

1. Field of the Invention

The present invention concerns a method and an apparatus for mixing liquid and paste-like substances, for example, for preparation of food in pots for large kitchens.

2. Description of the Prior Art

Pots for large kitchens of the order of 200-300 liters are still normally mixed by hand, which is very heavy work especially in the preparation of paste-like foods such as mashed potatoes, porridge, stews and the like.

There are commercial mixing apparatuses for this purpose, but none of them has been shown to function in a satisfactory way and especially not for paste-like foods of the above mentioned types.

It is known for instance from U.S. Pat. No. 3,580,550 that for mixing of viscous liquids, especially paint, one can use a propeller with two blades whose inclinations are opposite in order to realize a flow in the liquid substance. Part of the substance flows vertically upwards while another part flows vertically downwards. However, this apparatus is solely appropriate for liquid substances and cannot produce an effective mixing of paste-like substances.

It is further known from U.S. Pat. No. 2,513,254 to arrange two rotating mixers which rotate in opposite directions around the same center in order to realize mixing of a paste-like substance, for instance dough. The apparatus is very complicated, however, and is probably hard to clean.

BRIEF SUMMARY OF THE INVENTION

The object of the invention is to provide a method and an apparatus for effective mixing of both liquid and paste-like substances, which is especially valuable, e.g., in kettles where the consistency of the substance can vary from almost solid form to liquid.

This has been achieved by the invention wherein a portion of layer by layer is mechanically lifted while another part is pressed downward by two mixers rotating in opposite directions, which under simultaneous rotation are raised and lowered in the vertical direction through the substance, whereby upward and downward circulatory motion of the substance is obtained.

The invention also provides an apparatus for carrying out the method described above, which includes two mixers which can be raised and lowered in the vertical direction and which rotate oppositely with respect to each other, and each of which contains blade groups with opposite inclinations as viewed in the rotational direction.

DESCRIPTION OF THE DRAWINGS

The invention will hereinafter be described in greater detail with reference to the accompanying drawings wherein;

FIG. 3 is a front elevational view of the apparatus of FIG. 1, and FIG. 4 is a perspective view of a mixer.

DESCRIPTION OF PREFERRED EMBODIMENTS

Figure 1:
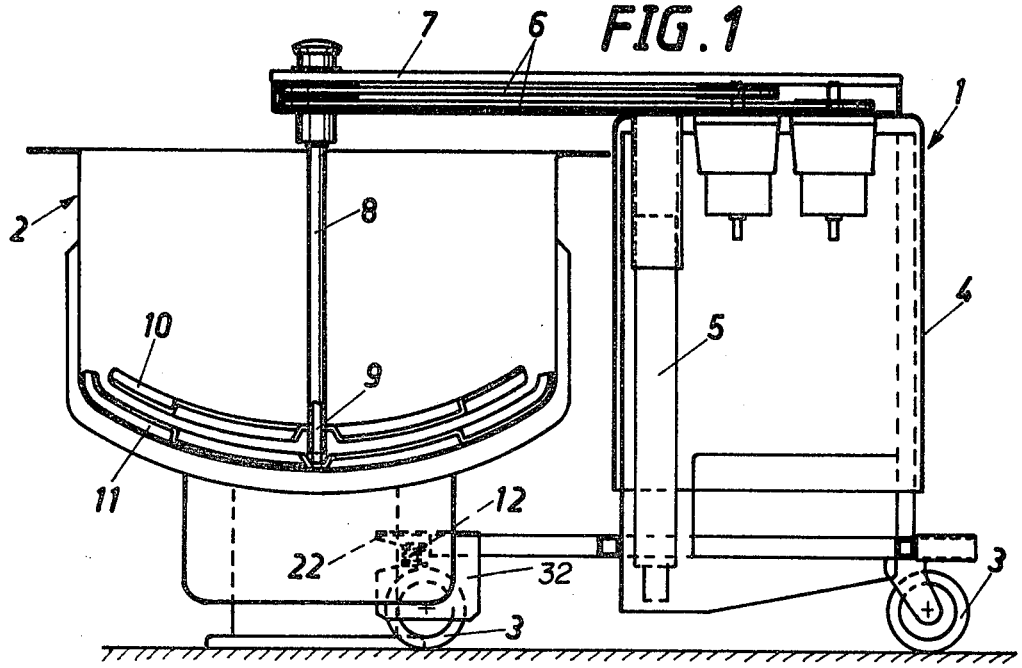
FIG. 1 is a schematic section view through the apparatus according to the invention when attached to a kettle.

The apparatus consists of a mobile unit 1, which can be partly inserted under a kettle 2 and affixed to it. The mobile unit rests on wheels 3 and consists of a support 4, which supports a telescopic column 5 which can be raised and lowered. On that column 5 are affixed drive and transmission apparatuses 6, which rotate a pair of spindles 8 and 9, which are vertically supported on a cantilever and are each connected to mixers 10 and 11. The cantilever 7 can be raised and lowered so much that the mixers 10 and 11 can be brought to a position above the pot 2.

Figure 2:
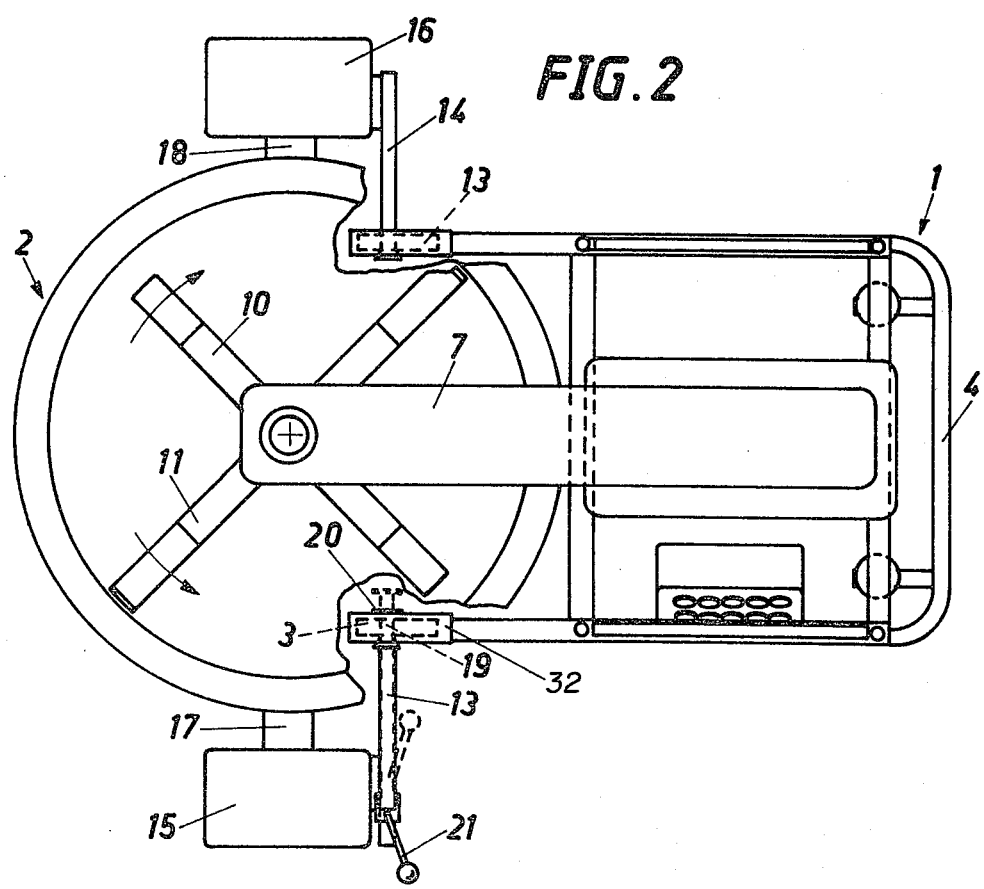
FIG. 2 is a plan view of the apparatus according to FIG. 1 partly broken away for clarity.

The mobile unit 1 is by means of a clamping apparatus 12 affixed to the pot 2 and centered in an exact position relative to it, which is very important because the mixers 10 and 11 reach out almost to the inside walls of the pot 2. The aforesaid clamping apparatus 12 includes a pair of square pipes 13, 14 each fixed to a column 15, 16 respectively attached to the floor, which columns are arranged on either side of the pot 2 and which support rotatable shafts 17, 18 and drive and transmission apparatus for tipping the pot 2 when it is to be emptied of its contents. In one of the square pipes 13 there is mounted another square pipe 19 that can be adjusted and which has a plate 20 attached to its outer end. Using a lever 21 the square pipe 19 can be adjusted between two terminal positions, an extended position (dash-lines in FIGS. 2 and 3) for attachment to the mobile unit 1 and a collapsed position (shown with full lines) for locking the mobile unit 1. The mobile unit's 1 front wheel pair 3 has wheel protectors 32 designed with a fork-like area 22 in which the square pipe 19 in extended position and correspondingly the fixed square pipe 14 on the opposite side can be positioned. The fixed square pipes 13, 14 are each equipped with a centering apparatus 23, 24 on their opposing ends in order to facilitate centering the mobile unit 1. When it is centered it is locked into position by drawing the square pipe 19 inwards while the plate 20 is pressed against the wheel protector 32 (FIG. 2).

The mixers 10 and 11 are driven in opposite directions of rotation and are so constructed that during mixing they mechanically lift the substance upwards along the outer periphery of the pot and press it downwards along the middle part of the pot, or vice versa. The mixers consist of two propellers 10 and 11 in principle according to FIG. 4. Each propeller has two blade groups 24-27 and 28-31 on each side of the rotating axle and with opposite inclinations as viewed in the rotation direction, whereby the outer blade groups 24, 27 and 28, 31 on the upper propeller 10 rotating clockwise and on the lower propeller 11 rotating counterclockwise, respectively, lift the substance upwards, while the inner blade groups 25, 26 and 29, 30 press the substance downwards.

As the propellers 10, 11 work in more or less solid pastelike substances such as for example mashed potatoes or boiled potatoes, fixed propellers cannot produce any vertical motion of the substance. By moving both the propellers 10, 11 slowly in the vertical direction by raising and lowering the arm 7 a part of the substance can be pressed downward layer by layer by the blade groups 25, 26 and 29, 30 a distance corresponding to the thickness of the blades during one rotation. As the propellers are simultaneously moved downward a corresponding amount the aforesaid blade groups 25, 26 and 29, 30 will move the same amount of the substance one more step downward during the next rotation. In this way an amount of the substance is moved from the surface of the pot 2 all the way to its bottom. Simultaneously the propellers 10, 11, which rotate in opposite directions next to each other, insure that the substance is effectively mixed in the radial layers.

If the propellers 11 are equipped with angled planes between the blade groups (not shown), motion of the substance also in the radial direction is obtained and a very effective mixing is realized.

If the substance is in liquid form the propellers 10, 11 work in the manner described above and in addition a flow of the liquid can be obtained.

The invention is of course not limited to the embodiment according to the drawings but can be varied within the scope of the claims which follow. For instance it is possible to have an apparatus attached to a crane on the roof or walls. When attached to the roof no cantilever is needed, and the apparatus can be placed directly above the kettle in question.

What we claim is:

1. A method for mixing liquid and paste-like substances, for example while preparing food in pots, comprising, immersing two coaxially vertically spaced mixers in the substance to be mixed, rotating the two mixers in opposite directions with respect to each other, raising and lowering the mixers simultaneously in the vertical direction through the substance while rotating, mechanically lifting a portion of the substance layer by layer by portions of each mixer and simultaneously mechanically pressing downwardly another portion of the substance layer by layer by other portions of each mixer thereby producing upward and downward circulatory motion of the substance.

2. The method of claim 1 wherein said lifting step is performed on the radially outer portion of the substance and the downwardly pressing step is performed on the radially inner portion of the substance so that the substance is circulated upwardly at the radially outer portions and downwardly at the central portion.

3. Apparatus for mixing liquid and paste-like substances, such as in preparing food in kettles, wherein substantially radially extending mixers are supported and rotatably driven by a central drive shaft comprising, two coaxially arranged mixers having substantially radially extending blades, said mixers being positioned in vertical spaced relationship with respect to each other, a separate supporting and drive shaft attached to the central part of each mixer, means to rotatably support said drive shafts, means to rotate each drive shaft in opposite directions, each blade from its center to its radially outer end comprising a portion thereof inclined with respect to the direction of rotation to produce a lifting force on the substance being mixed as the blade is rotated and a portion inclined in the opposite direction to produce a downwardly pressing force on said substance as the blade is rotated, like inclined portions on each blade corresponding substantially in the radial position so that rotation of said mixers produces an upward and downward circulation of the substance, and means for raising and lowering said mixers during rotation thereof.

4. The apparatus as claimed in claim 3 wherein said oppositely inclined portions of said blades which produce said lifting and downwardly pressing forces are located on the radially outer and inner portions respectively of each blade.

5. The apparatus as claimed in claim 4 wherein said kettle is supported on a kettle support means and said means to support said drive shaft is a mobile unit comprising a support frame, wheels rotatably mounted on said frame, means on said frame for releasably attaching said frame to said kettle support means so that said mixers are substantially centered in said kettle in use, a vertically reciprocable column mounted on said frame, a cantilevered support arm attached to said column and rotatably supporting said drive shafts at the outer end, said means to rotate said drive shafts being supported on said cantilevered support arm, and means to raise and lower said column.

6. The apparatus as claimed in claim 3 wherein said kettle is supported on a kettle support means and said means to support said drive shaft is a mobile unit comprising a support frame, wheels rotatably mounted on said frame, means on said frame for releasably attaching said frame to said kettle support means so that said mixers are substantially centered in said kettle in use, a vertically reciprocable column mounted on said frame, a cantilevered support arm attached to said column and rotatably supporting said drive shafts at the outer end, said means to rotate said drive shafts being supported on said cantilevered support arm, and means to raise and lower said column.

* * * * *